United States Patent
Song et al.

(10) Patent No.: US 8,229,375 B2
(45) Date of Patent: Jul. 24, 2012

(54) TRANSMITTING DEVICE, TRANSMIT POWER CONTROL METHOD AND CONTROL DEVICE THEREOF IN MICROWAVE SYSTEM

(75) Inventors: Xiaobin Song, Shenzhen (CN); Xianfeng Li, Shenzhen (CN); Bangmei Deng, Shenzhen (CN); Xuekun Zhang, Shenzhen (CN); Yaoming Chen, Shenzhen (CN); Hui Song, Shenzhen (CN); Jian Pu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 376 days.

(21) Appl. No.: 12/503,981

(22) Filed: Jul. 16, 2009

(65) Prior Publication Data

US 2010/0151804 A1 Jun. 17, 2010

(30) Foreign Application Priority Data

Dec. 15, 2008 (CN) .......................... 2008 1 0220023

(51) Int. Cl.
*H04B 1/04* (2006.01)
(52) U.S. Cl. ............... 455/127.1; 455/127.2; 455/127.4; 455/126
(58) Field of Classification Search .................. 455/126, 455/127.1–127.4, 115.1; 330/10, 278, 291
See application file for complete search history.

(56) References Cited

U.S. PATENT DOCUMENTS

| 7,047,006 | B2 * | 5/2006 | Classon et al. ................. 455/434 |
| 7,091,587 | B2 * | 8/2006 | Sato et al. ...................... 257/685 |
| 7,684,514 | B2 * | 3/2010 | Saito et al. ...................... 375/297 |
| 2002/0094788 | A1 * | 7/2002 | Hayashi et al. ................... 455/73 |
| 2004/0208591 | A1 | 10/2004 | Willebrand et al. |
| 2005/0110565 | A1 * | 5/2005 | Robinson .................. 330/124 R |
| 2005/0136865 | A1 * | 6/2005 | Dupuis ........................ 455/127.1 |

(Continued)

FOREIGN PATENT DOCUMENTS

CN 1451210 10/2003

(Continued)

OTHER PUBLICATIONS

European Office Action issued on Jul. 16, 2010 in corresponding European Patent Application No. 09166558.8.

(Continued)

*Primary Examiner* — Duc M Nguyen
(74) *Attorney, Agent, or Firm* — Staas & Halsey LLP (57) ABSTRACT

A transmitting device, a transmit power control method and a control device thereof in a microwave system are provided. The transmitting device includes a transmit power control module, adapted to acquire a switching event of a modulation mode of the microwave system, and adjust a transmit power of a radio frequency transmitting module according to the switching event and a preset power control mode; and the radio frequency transmitting module, adapted to send a microwave signal to a communication peer end by adopting the transmit power adjusted by the transmit power control module. Through setting the power control module, the gain of an AM microwave system is enhanced, and the service impairment caused by the AM microwave system when actuating an ATPC function is avoided. Correspondingly, a transmit power control method in a microwave system is also provided, which enables to switch to a low modulation mode as quickly as possible without causing the service impairment when the signal is deteriorated and enhances the system gain when the signal quality is improved.

8 Claims, 6 Drawing Sheets

U.S. PATENT DOCUMENTS

| | | | |
|---|---|---|---|
| 2005/0218989 A1* | 10/2005 | Tsutsui et al. | 330/285 |
| 2005/0242879 A1* | 11/2005 | Muller | 330/259 |
| 2006/0068826 A1 | 3/2006 | Leonard | |
| 2010/0167671 A1* | 7/2010 | Kawaji | 455/127.5 |

FOREIGN PATENT DOCUMENTS

| | | |
|---|---|---|
| CN | 1756117 | 4/2006 |
| CN | 1943121 | 4/2007 |
| CN | 101478815 | 10/2010 |
| EP | 2023558 A1 | 2/2009 |
| WO | 2007/138796 A1 | 12/2007 |

OTHER PUBLICATIONS

Communication Pursuant to Article 94(3) EPC, mailed Mar. 2, 2010, in corresponding European Application No. 09166558.8 (6 pp.).

* cited by examiner

TRANSMITTING DEVICE, TRANSMIT POWER CONTROL METHOD AND CONTROL DEVICE THEREOF IN MICROWAVE SYSTEM

CROSS-REFERENCE TO RELATED APPLICATIONS

This application claims priority to Chinese Patent Application No. 200810220023.8, filed on Dec. 15, 2008, which is hereby incorporated by reference in its entirety.

FIELD OF THE TECHNOLOGY

The present invention relates to the field of electronic communication, and more particularly to a transmitting device, a transmit power control method and a control device thereof in a microwave system.

BACKGROUND

As the mobile network technologies have made an evolution and the service model has developed and transformed towards multimedia comprehensive applications including voice, video and data, the conventional microwave of plesiochronous digital hierarchy (PDH)/synchronous digital hierarchy (SDH) based on a fixed transfer bandwidth cannot well satisfy the requirements of mobile services on the bandwidth of the retransmission network. Thus, microwave equipment in a new generation that supports an adaptive modulation (AM) function has been introduced. The microwave equipment that supports the AM function can dynamically adjust an air interface transfer bandwidth. When an air interface link quality is quite high (for example, in a nice weather), the equipment may adopt a high modulation mode, for example, 128 quadrature amplitude modulation (128 QAM), so as to provide a large-bandwidth transfer capability. When the air interface link quality is deteriorated (for example, in a heavy rain or thick fog), the equipment may adopt a low modulation mode, for example, quadrature phase shift keying (QPSK), so as to enhance an anti-interference capability of the link, thereby enhancing the transmission quality of important user data.

The microwave radio frequency power amplifier circuit has a nonlinear distortion problem, and the degree of distortion increases as the increasing of the transmit power. The microwave system has a high requirement on a linearity of the radio frequency power amplifier circuit when adopting the high modulation mode, and has a low requirement on a linearity when adopting the low modulation mode. In order to reduce the nonlinear distortion of the power amplifier circuit, a manner of reducing the radio frequency transmit power may be adopted, which is referred to as power back-off. In the microwave system, a microwave system gain equals a sum of a transmit power and a receiving sensitivity value of the microwave system.

If an AM microwave system adopts a manner of a constant radio frequency transmit power of the conventional microwave, the transmit power needs to be backed off to a transmit power value of the highest modulation mode. If the system works at a lower modulation mode, a maximum system gain cannot be achieved, so that the anti-fading capability of the system is reduced.

Meanwhile, an automatic transmit power control (ATPC) technique has been introduced to the AM microwave system, and the ATPC technique sets an upper threshold value and a lower threshold value for a receive power of the microwave system. When a receive power is lower than the lower threshold value, a sending side is notified through a protocol to reduce the transmit power; and when the receive power is higher than the upper threshold value, the sending side is notified through a protocol to increase the transmit power. As the modulation mode of the sending side of the AM microwave system varies at any time, if the transmit power of the sending side is simply controlled by the receiving side, the transmit power of the sending side may possibly exceed the maximum transmit power allowed by the current modulation mode, thus causing a service impairment.

SUMMARY

Accordingly, embodiments of the present invention are directed to a transmitting device, a transmit power control method and a control device thereof in a microwave system, which are capable of increasing a system gain of an AM microwave system as high as possible, and meanwhile avoiding a service impairment caused by the AM microwave system when actuating an ATPC function.

In embodiments of the present invention, a transmitting device in a microwave system is provided. The transmitting device includes a transmit power control module and a radio frequency transmitting module.

The transmit power control module is adapted to acquire a switching event of a modulation mode of the microwave system, and adjust a transmit power of the radio frequency transmitting module according to the switching event and a preset power control mode.

The radio frequency transmitting module is adapted to send a microwave signal to a communication peer end by adopting the transmit power adjusted by the transmit power control module.

In order to effectively control the transmit power, in embodiments of the present invention, a transmit power control method in a microwave system is provided. The method includes the following steps:

acquiring a switching event of a modulation mode of the microwave system; and adjusting a transmit power of a radio frequency transmitting module according to the switching event and a preset power control mode.

Correspondingly, in embodiments of the present invention, a transmit power control device is provided. The transmit power control device includes a switching event receiving unit and a power adjusting unit.

The switching event receiving unit is adapted to receive a switching event of a modulation mode of the microwave system.

The power adjusting unit is adapted to adjust a transmit power of a radio frequency transmitting module according to the switching event and a preset power control mode.

When the embodiments of the present invention are implemented, by disposing the transmit power control module in the system, the service impairment caused by the AM microwave system when actuating the ATPC function can be avoided, a low modulation mode can be switched as quickly as possible without causing service impairment when the signal is deteriorated, and the system gain can be enhanced when the signal quality is improved.

DETAILED DESCRIPTION

In the embodiments of the present invention, a transmitting device, a transmit power control method and a control device thereof in a microwave system are provided. By introducing a transmit power control module into the microwave system, the system gain of the AM microwave system can be enhanced as high as possible, and meanwhile, the service impairment caused by the AM microwave system when actuating the ATPC function can be avoided.

To make the objectives, technical solutions, and advantages of the present invention more comprehensible, the present invention is described below in great detail with reference to the accompanying drawings.

Figure 1:
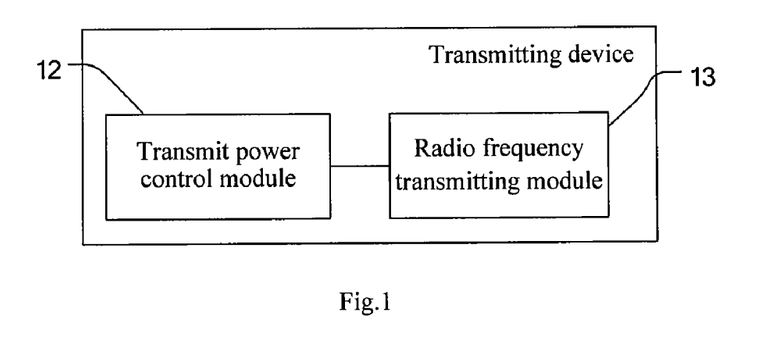
FIG. 1 is a first structural view of a transmitting device in a microwave system according to an embodiment of the present invention.

FIG. 1 is a first structural view of a transmitting device in a microwave system according to an embodiment of the present invention. Referring to FIG. 1, the transmitting device includes a transmit power control module 12 and a radio frequency transmitting module 13.

The transmit power control module 12 is adapted to acquire a switching event of a modulation mode of the microwave system, and adjust a transmit power of the radio frequency transmitting module 13 according to the switching event and a preset power control mode.

The radio frequency transmitting module 13 is adapted to send a microwave signal to a communication peer end by adopting the transmit power adjusted by the transmit power control module 12.

Figure 2:
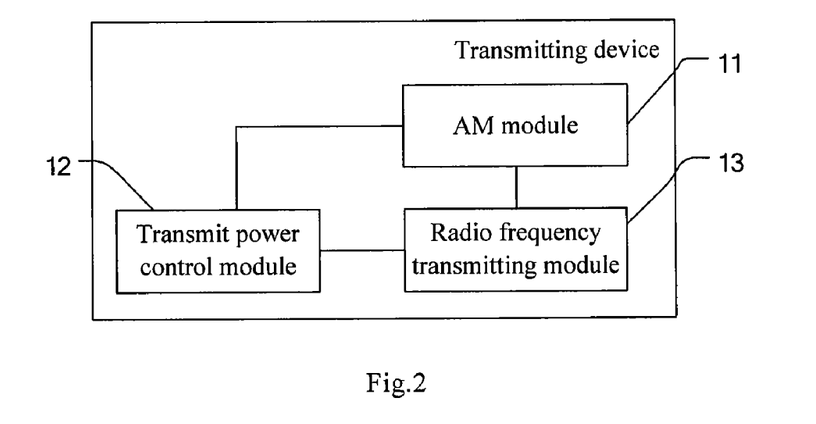
FIG. 2 is a second structural view of a transmitting device in a microwave system according to an embodiment of the present invention.

FIG. 2 is a second structural view of a transmitting device in a microwave system according to an embodiment of the present invention. Referring to FIG. 2, the transmitting device includes an AM module 11, a transmit power control module 12, and a radio frequency transmitting module 13.

The AM module 11 is adapted to determine a switching event of a modulation mode of the microwave system according to an air interface link quality or a manually configured command, notify the transmit power control module 12 about the switching event, and switch the modulation mode according to the determined switching event after receiving a power adjustment complete event fed back by the transmit power control module 12, or adapted to determine the switching event of the modulation mode of the microwave system according to the air interface link quality or the manually configured command, and then notify the transmit power control module 12 about the switching event after completing a switching.

After completing the switching, the AM module 11 modulates information to be sent according to the switched modulation mode, and outputs the modulated information to the radio frequency transmitting module 13, so that the radio frequency transmitting module 13 sends the information by adopting the transmit power adjusted by the transmit power control module 12.

Particularly, in the embodiment of the present invention, the step of determining the switching event of the modulation mode of the microwave system according to the air interface link quality includes: when the air interface link quality is quite high (for example, in a nice weather), the equipment may adopt a high modulation mode (for example, 128 QAM), so as to provide a large-bandwidth transfer capability, and thus, the system is switched to the high modulation mode from other modulation modes and presents the switching event; and when the air interface link quality is deteriorated (for example, in a heavy rain or thick fog), the equipment may adopt a low modulation mode (for example, QPSK), so as to enhance an anti-interference capability of the link, so that the system is switched to the low modulation mode from other modulation modes and presents the switching event. Definitely, a manual control method may be adopted as well, in which the modulation mode of the microwave system is switched from the high modulation mode to the low modulation mode or from the low modulation mode to the high modulation mode under the configured command sent manually.

Figure 3:
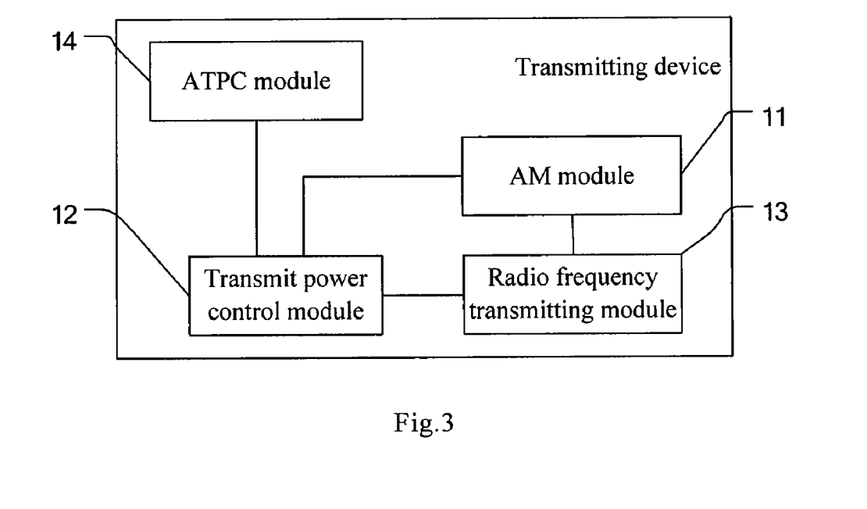
FIG. 3 is a structural view of a transmitting device added with an ATPC module in a microwave system according to an embodiment of the present invention.

FIG. 3 is a structural view of a transmitting device added with an ATPC module in a microwave system according to an embodiment of the present invention. The transmitting device includes: an AM module 11, a transmit power control module 12, a radio frequency transmitting module 13, and an ATPC module 14.

The ATPC module 14 is adapted to notify the transmit power control module 12 to adjust a transmit power of the radio frequency transmitting module 13 according to a receive power of the microwave system.

Figure 4:
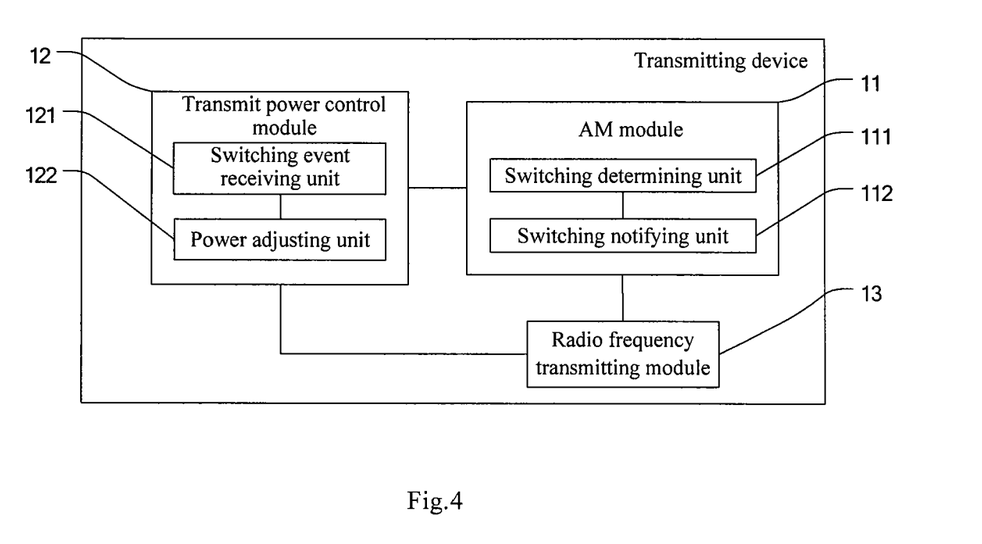
FIG. 4 is a first detailed structural view of a transmitting device in a microwave system according to an embodiment of the present invention.

FIG. 4 is a first detailed structural view of a transmitting device in a microwave system according to an embodiment of the present invention.

The AM module 11 includes a switching determining unit 111 and a switching notifying unit 112.

The switching determining unit 111 is adapted to determine the switching event.

The switching notifying unit 112 is adapted to notify the transmit power control module 12 about the switching event.

The transmit power control module 12 includes a switching event receiving unit 121 and a power adjusting unit 122.

The switching event receiving unit 121 is adapted to receive the switching event.

The power adjusting unit 122 is adapted to adjust the transmit power of the radio frequency transmitting module 13 according to the switching event received by the switching event receiving unit 121 and the preset power control mode.

Figure 5:
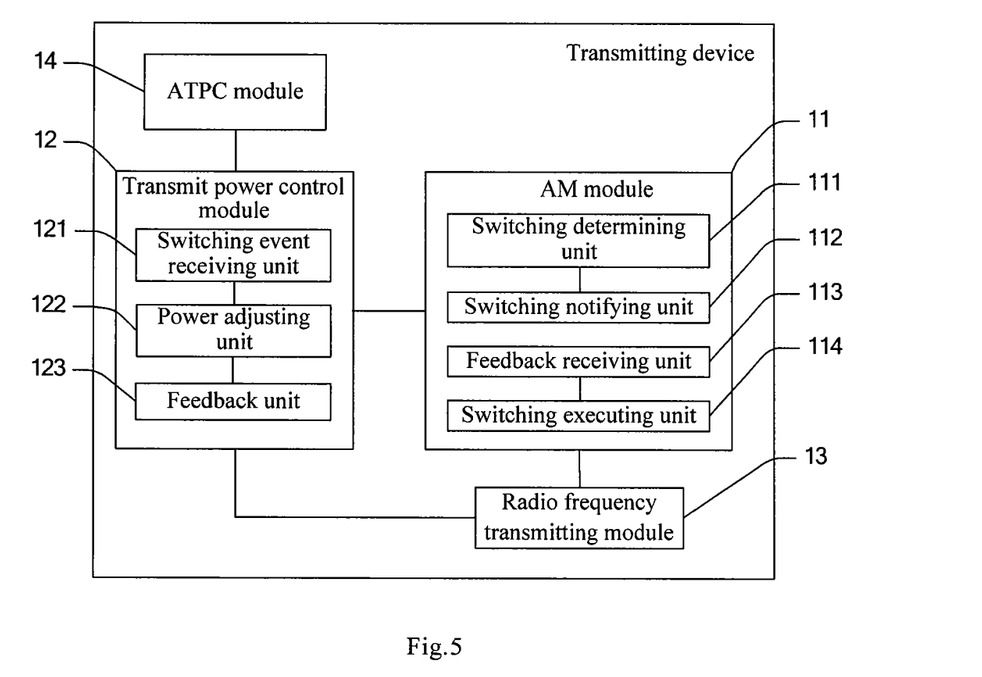
FIG. 5 is a second detailed structural view of a transmitting device in a microwave system according to an embodiment of the present invention.

FIG. 5 is a second detailed structural view of a transmitting device in a microwave system according to an embodiment of the present invention.

The AM module 11 includes a switching determining unit 111, a switching notifying unit 112, a feedback receiving unit 113, and a switching executing unit 114.

The switching determining unit 111 is adapted to determine the switching event.

The switching notifying unit 112 is adapted to notify the transmit power control module 12 about the switching event.

The feedback receiving unit 113 is adapted to receive the power adjustment complete event fed back by the transmit power control module 12.

The switching executing unit 114 is adapted to switch the modulation mode according to the switching event determined by the switching determining unit 111.

The transmit power control module 12 includes a switching event receiving unit 121, a power adjusting unit 122, and a feedback unit 123.

The switching event receiving unit 121 is adapted to receive the switching event of the modulation mode of the microwave system sent from the AM module 11.

The power adjusting unit 122 is adapted to adjust the transmit power of the radio frequency transmitting module 13 according to the switching event received by the switching event receiving unit 121 and the preset power control mode.

The feedback unit 123 is adapted to feed back the power adjustment complete event to the AM module 11 when the power adjusting unit 122 has completed the power adjustment.

The ATPC module 14 is adapted to notify the transmit power control module 12 to adjust the transmit power of the radio frequency transmitting module 13 according to the receive power of the microwave system.

Particularly, the ATPC module 14 sets an upper threshold value and a lower threshold value for the receive power of the microwave system. When an actual receive power is lower than the lower threshold value, the ATPC module 14 sends a power control instruction to notify the transmit power control module 12 to reduce the transmit power of the radio frequency transmitting module 13. When the actual receive power is higher than the upper threshold value, the ATPC module 14 sends a power control instruction to notify the transmit power control module 12 to increase the transmit power of the radio frequency transmitting module 13.

Figure 6:
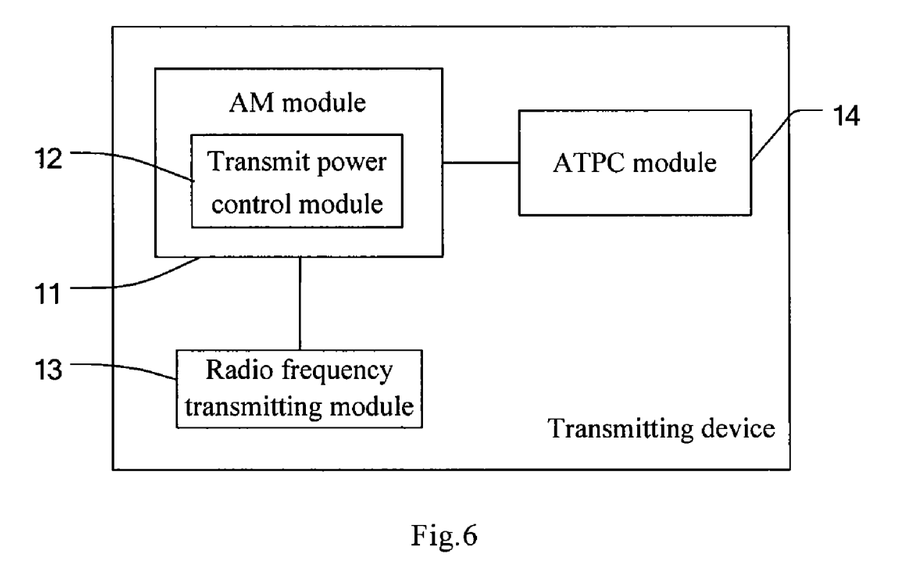
FIG. 6 is a third structural view of a transmitting device in a microwave system according to an embodiment of the present invention.

FIG. 6 is a third structural view of a transmitting device in a microwave system according to an embodiment of the present invention. Referring to FIG. 6, the transmit power control module 12 is integrated in the AM module 11 as a component.

Similarly, referring to the structure shown in FIG. 6, the transmit power control module 12 may be integrated in the radio frequency transmitting module 13 or the ATPC module 14 as a component, and such an integrating process is obvious for persons skilled in the art, which is thus not described herein again.

It should be noted that, in an embodiment of the present invention, a transmit power control device is further provided, which has a structure similar to the above transmit power control module, and the details will not be described herein again.

When the embodiments of the present invention are implemented, by disposing the transmit power control module in the system, the service impairment caused by the AM microwave system when actuating the ATPC function can be avoided, a low modulation mode can be switched as quickly as possible without causing service impairment when the signal is deteriorated, and the system gain can be enhanced when the signal quality is improved.

Figure 7:
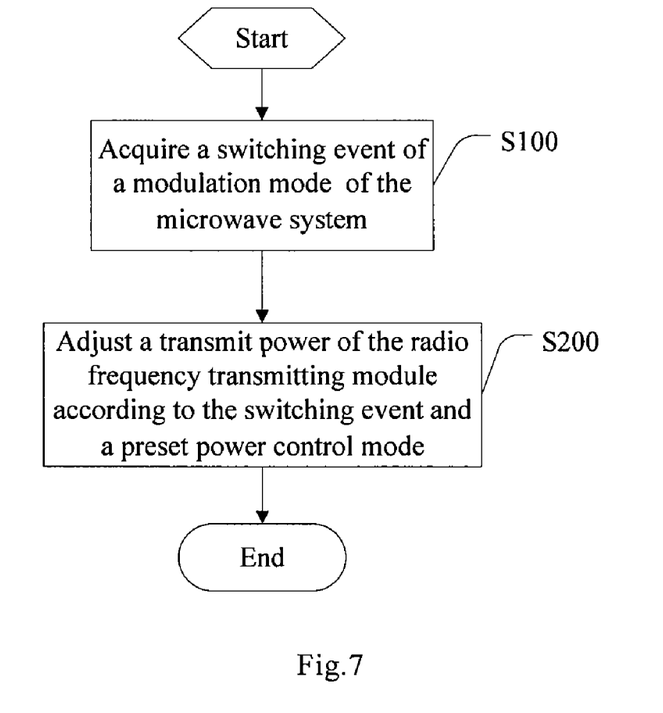
FIG. 7 is a main flow chart of a transmit power control method in a microwave system according to an embodiment of the present invention.

In an embodiment of the present invention, a transmit power control method in a microwave system is further provided. FIG. 7 is a main flow chart of a transmit power control method in a microwave system according to an embodiment of the present invention. Referring to FIG. 7, the method includes the following steps.

In Step S100, a switching event of a modulation mode of the microwave system is acquired.

In Step S200, a transmit power of a radio frequency transmitting module is adjusted according to the switching event and a preset power control mode.

Figure 8:
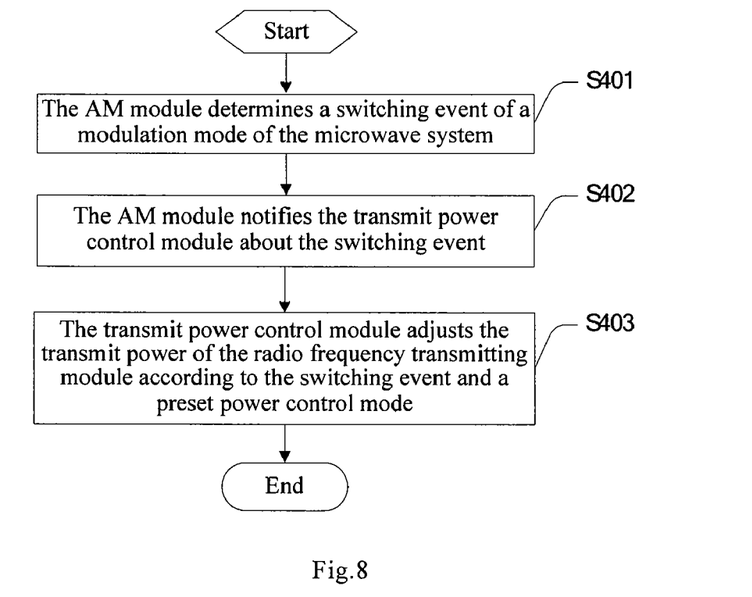
FIG. 8 is a specific flow chart of a transmit power control method in a microwave system according to an embodiment of the present invention.

FIG. 8 is a specific flow chart of a transmit power control method in a microwave system according to an embodiment of the present invention. Referring to FIG. 8, the method includes the following steps.

In Step S401, an AM module determines a switching event of a modulation mode of the microwave system.

In Step S402, the AM module notifies the transmit power control module about the switching event.

In Step S403, the transmit power control module adjusts the transmit power of the radio frequency transmitting module according to the switching event and a preset power control mode.

Figure 9:
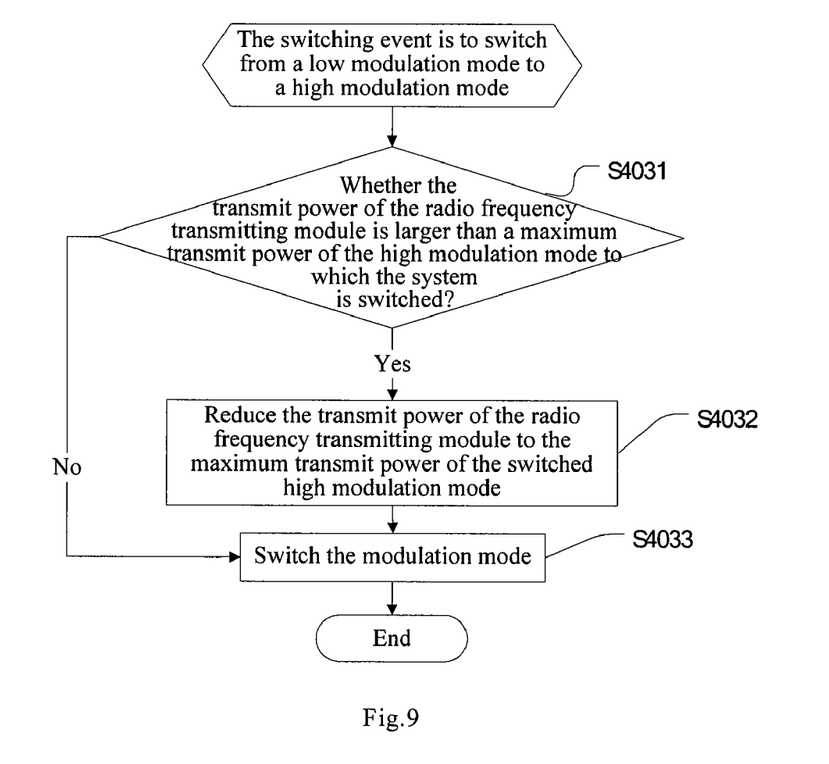
FIG. 9 is a flow chart of a processing method of Step S403 when the switching event is to switch from a low modulation mode to a high modulation mode.

FIG. 9 is a flow chart of a processing method of Step S403 when the switching event is to switch from a low modulation mode to a high modulation mode, which includes the following steps.

In Step S4031, the transmit power control module determines whether the transmit power of the radio frequency transmitting module is larger than a maximum transmit power of the high modulation mode to which the system is switched, and if yes, Step S4032 is performed; otherwise, Step S4033 is performed.

In Step S4032, the transmit power of the radio frequency transmitting module is reduced to the maximum transmit power of the switched high modulation mode.

In Step S4033, the AM module switches the modulation mode from the low modulation mode to the high modulation mode.

Figure 10:
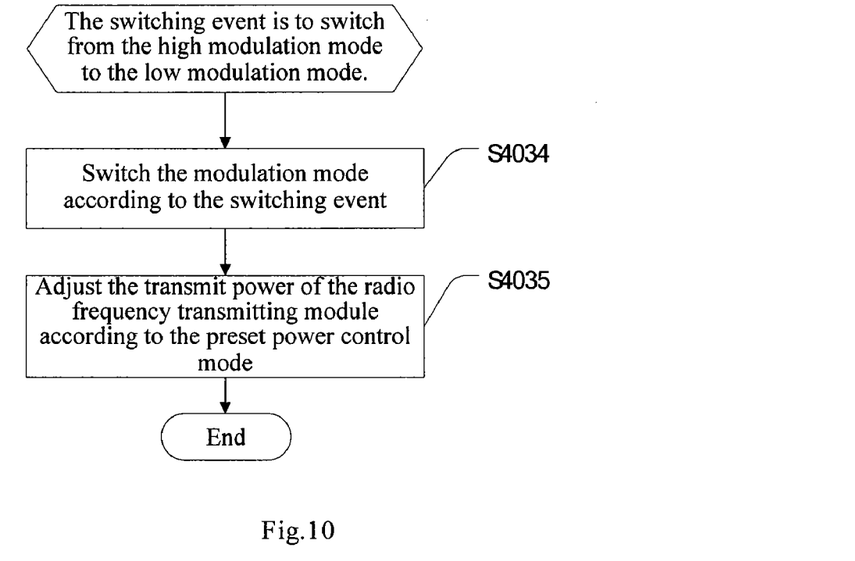
FIG. 10 is a flow chart of a processing method of Step S403 when the switching event is to switch from a high modulation mode to a low modulation mode.

FIG. 10 is a flow chart of a processing method of Step S403 when the switching event is to switch from the high modulation mode to the low modulation mode, which includes the following steps.

In Step S4034, the AM module switches the modulation mode from the high modulation mode to the low modulation mode according to the switching event.

In Step S4035, the transmit power control module adjusts the transmit power of the radio frequency transmitting module according to the preset power control mode.

It should be noted that, in the embodiments of the present invention, according to actual circumstances, the preset power control mode may be set to a first power control mode for different requirements, for example, when two microwave equipments are relatively close to each other, or the power back-off of the radio frequency transmitting module is relatively small and the requirement on the system gain can be satisfied without demanding the transmission to be performed at a maximum transmit power.

Correspondingly, when two microwave equipments are relatively far away from each other, or when the power back-off of the radio frequency transmitting module is relatively large and the transmission to be performed at a transmit power as high as possible is required to enhance the system gain, a second power control mode may be set.

If the AM microwave system actuates the ATPC function, in order to avoid the service impairment (for example, service bit error and so on), a third power control mode may be set.

The flows of the power control method in the microwave system under the above three modes are further described below with reference to the accompanying drawings.

Figure 11:
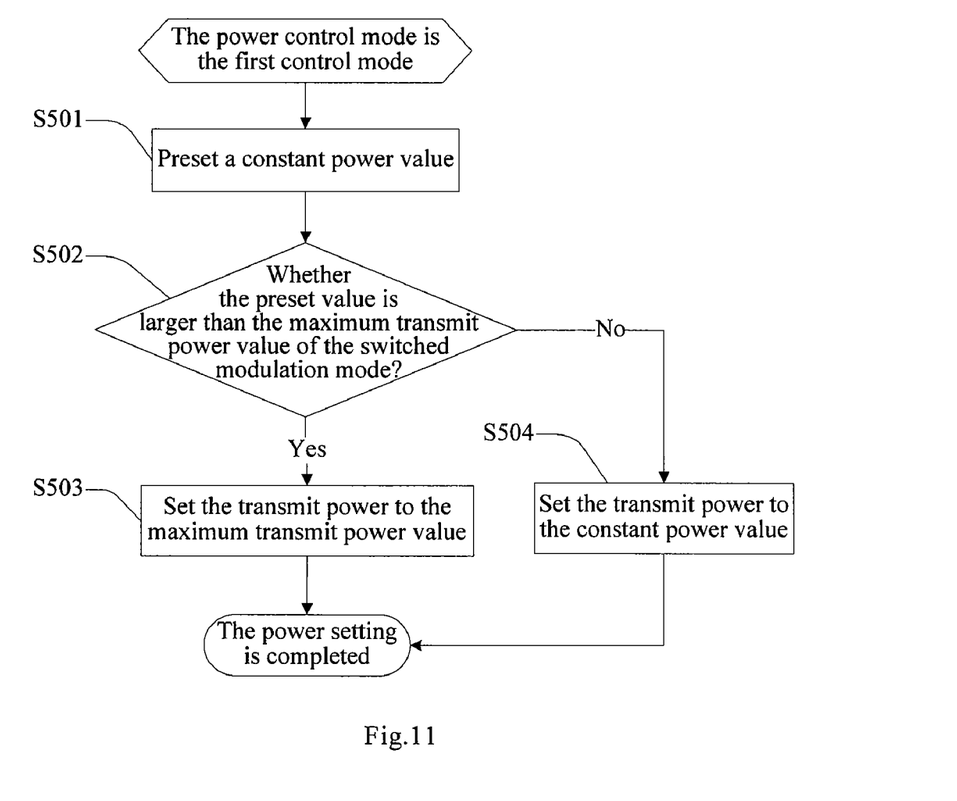
FIG. 11 is a detailed flow chart of Step S4035 under a first power control mode.

FIG. 11 is a detailed flow chart of Step S4035 under the first power control mode, which includes the following steps.

In Step S501, a constant power value is preset.

In Step S502, it is determined whether the preset constant power value is larger than the maximum transmit power value of the switched modulation mode or not, and if yes, Step S503 is performed; otherwise, Step S504 is performed.

In Step S503, the transmit power is set to the maximum transmit power value.

In Step S504, the transmit power is set to the constant power value.

Specifically, the first power control mode is applicable to the circumstance that two microwave equipments are relatively close to each other, or the power back-off of the radio frequency transmitting module is relatively small and the requirements on the system gain can be satisfied without demanding the transmission to be performed at the maximum transmit power.

Figure 12:
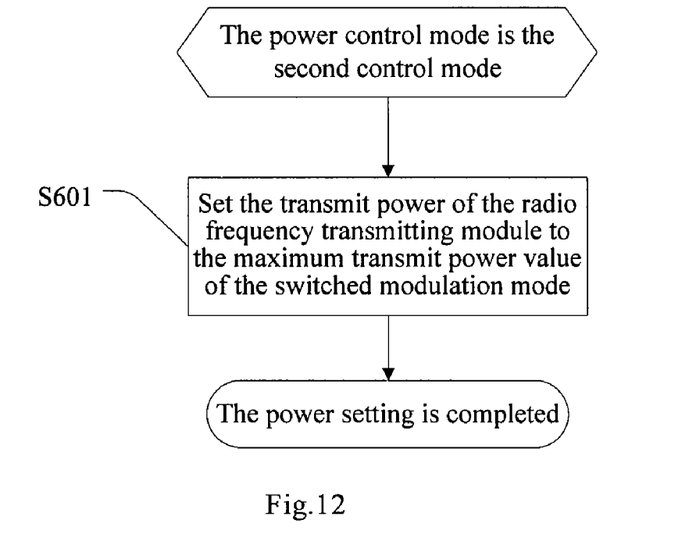
FIG. 12 is a detailed flow chart of Step S4035 under a second power control mode.

FIG. 12 is a detailed flow chart of Step S4035 under the second power control mode, which includes the following steps.

In Step S601, the transmit power of the radio frequency transmitting module is set to the maximum transmit power of the switched modulation mode.

Specifically, the second power control mode is applicable to the circumstance that two microwave equipments are relatively far away from each other, or the power back-off of the radio frequency transmitting module is relatively large and the transmission to be performed at a transmit power as high as possible is required to enhance the system gain. Under this mode, the transmit power of the radio frequency transmitting module always varies according to the switched modulation mode of the AM module, and is set to the maximum transmit power corresponding to the radio frequency transmitting module under the switched modulation mode.

Figure 13:
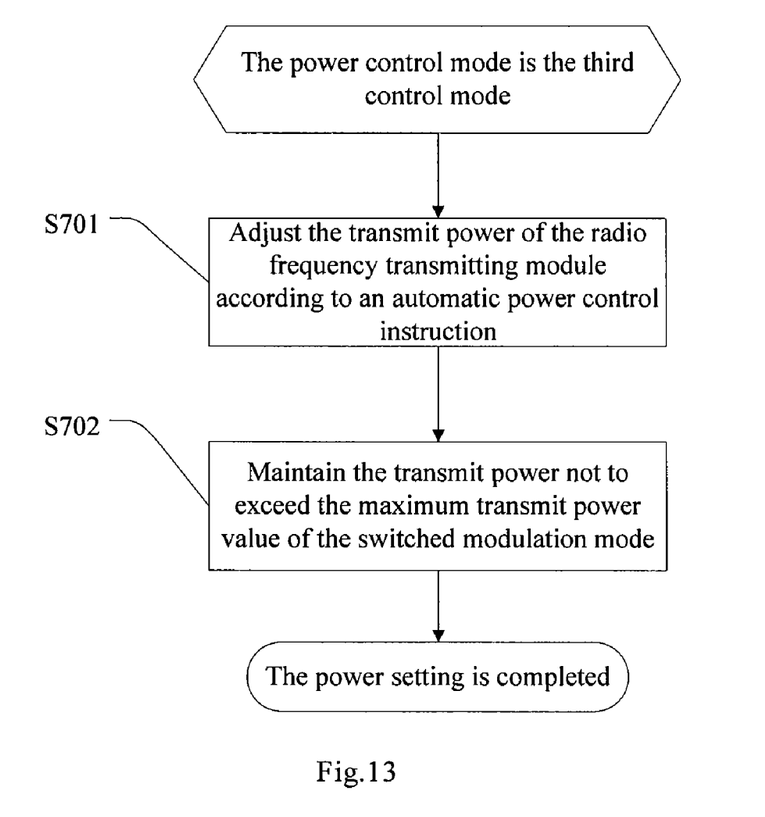
FIG. 13 is a detailed flow chart of Step S4035 under a third power control mode.

FIG. 13 is a detailed flow chart of Step S4035 under the third power control mode, which includes the following steps.

In Step S701, the transmit power of the radio frequency transmitting module is adjusted according to an automatic power control instruction.

Specifically, the automatic power control instruction may be sent by the ATPC module. The ATPC module sets an upper threshold value and a lower threshold value for the receive power of the microwave system. When an actual receive power is lower than the lower threshold value, the ATPC module sends a power control instruction to notify the transmit power control module to reduce the transmit power of the radio frequency transmitting module. When the actual receive power is higher than the upper threshold value, the ATPC module sends a power control instruction to notify the transmit power control module to increase the transmit power of the radio frequency transmitting module.

In Step S702, the transmit power is maintained not to exceed the maximum transmit power value of the switched modulation mode.

Specifically, the transmit power of the microwave system varies according to the power control instruction, and does not exceed the maximum transmit power value of the switched modulation mode, that is, the maximum value of the transmit power equals the maximum transmit power value.

Specifically, the third power control mode is applicable to the AM microwave system that actuates the ATPC function. Under the third power control mode, it is restricted that the maximum value of the transmit power of the radio frequency transmitting module cannot exceed the maximum transmit power corresponding to the radio frequency transmitting module under the switched modulation mode. Thus, the transmit power of the sending side of the microwave system cannot exceed the maximum transmit power allowed by the current modulation mode, thereby avoiding the service impairment (for example, service bit error and so on).

It should be noted that, persons of ordinary skill in the art shall understand that the transmit power control method in a microwave system according to the embodiments of the present invention can be realized through a computer program, an instruction, or programming by a programmable logical device, and the program could be stored in a storage medium, for example, an optical disc, a magnetic disc, or a flash memory.

When the embodiments of the present invention are implemented, by disposing the transmit power control module in the system, the service impairment caused by the AM microwave system when actuating the ATPC function can be avoided, a low modulation mode can be switched as quickly as possible without causing service impairment when the signal is deteriorated, and the system gain can be enhanced when the signal quality is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transmitting device in a microwave system, comprising a transmit power control module, a radio frequency transmitting module and an adaptive modulation (AM) module, wherein the AM module is configured to determine a switching event of a modulation mode of the microwave system, and send the switching event to the transmit power control module;

the transmit power control module is configured to include a switching event receiving unit, a power adjusting unit and a feedback unit, wherein the switching event receiving unit is configured to receive the switching event, and the power adjusting unit is configured to adjust a transmit power of the radio frequency transmitting module according to the received switching event and a preset power control mode, and the feedback unit is configured to feed back a power adjustment complete event to the AM module after the power adjusting unit has completed the power adjustment; and the radio frequency transmitting module is configured to send a microwave signal to a communication peer end by adopting the transmit power adjusted by the transmit power control module, wherein the power adjusting unit is further
configured to determine whether the transmit power of the radio frequency transmitting module is larger than a maximum transmit power of a high modulation mode when the switching event is to switch from a low modulation mode to the high modulation mode, and if the transmit power is larger than the maximum transmit power, reduce the transmit power of the radio frequency transmitting module to the maximum transmit power of the high modulation mode, and the feedback unit feeds back the power adjustment complete event to the AM module after completing the power adjustment; or configured to adjust the transmit power of the radio frequency transmitting module according to the power control mode after the modulation mode has been switched according the switching event when the switching event is to switch from the high modulation mode to the low modulation mode.

2. The transmitting device according to claim 1, further comprising:

an automatic transmit power control (ATPC) module, adapted to, according to a receive power of the microwave system, notify the transmit power control module to adjust the transmit power of the radio frequency transmitting module.

3. The transmitting device according to claim 2, wherein the transmit power control module is set independently, or is integrated on the AM module or the radio frequency transmitting module or the ATPC module as a component.

4. A transmit power control method in a microwave system, comprising:

acquiring a switching event of a modulation mode of the microwave system; and adjusting a transmit power of a radio frequency transmitting module according to the switching event and a preset power control mode, wherein the acquiring of the switching event of the modulation mode of the microwave system further comprises:

determining and sending, by an adaptive modulation (AM) module, the switching event of the modulation mode of the microwave system; and receiving, by a transmit power control module, the switching event sent by the AM module, and wherein the adjusting of the transmit power of the radio frequency transmitting module according to the switching event and the preset power control mode further comprises:

when the switching event is to switch from a low modulation mode to a high modulation mode, determining whether the transmit power of the radio frequency transmitting module is larger than a maximum transmit power of the high modulation mode or not; and if yes, reducing the transmit power of the radio frequency transmitting module to the maximum transmit power of the high modulation mode, and then switching the modulation mode; and when the switching event is to switch from the high modulation mode to the low modulation mode, firstly switching the modulation mode according to the switching event, and then adjusting the transmit power of the radio frequency transmitting module according to the power control mode.

5. The method according to claim 4, wherein the adjusting the transmit power of the radio frequency transmitting module according to the power control mode further comprises: determining whether a preset constant power value is larger than a maximum transmit power value of the switched modulation mode or not when the power control mode is a first control mode; and if yes, setting the transmit power of the radio frequency transmitting module to the maximum transmit power value; otherwise, setting the transmit power of the radio frequency transmitting module to the preset constant power value.

6. The method according to claim 4, wherein the adjusting the transmit power of the radio frequency transmitting module according to the power control mode further comprises: setting the transmit power of the radio frequency transmitting module to a maximum transmit power value of the switched modulation mode when the power control mode is a second control mode.

7. The method according to claim 4, wherein the adjusting the transmit power of the radio frequency transmitting module according to the power control mode further comprises: adjusting the transmit power of the radio frequency transmitting module according to an automatic power control instruction when the power control mode is a third control mode, wherein the transmit power does not exceed a maximum transmit power value of the switched modulation mode.

8. A transmit power control device, comprising a switching event receiving unit, a power adjusting unit and a feedback unit, wherein:

the switching event receiving unit is configured to receive a switching event of a modulation mode of a microwave system;

the power adjusting unit is configured to adjust a transmit power of a radio frequency transmitting module according to the received switching event and a preset power control mode; and the feedback unit is configured to feed back a power adjustment complete event to an adaptive modulation (AM) module after the power adjusting unit has completed the power adjustment, wherein the power adjusting unit is further configured to determine whether the transmit power of the radio frequency transmitting module is larger than a maximum transmit power of a high modulation mode when the switching event is to switch from a low modulation mode to the high modulation mode, and if the transmit power is larger than the maximum transmit power, reduce the transmit power of the radio frequency transmitting module to the maximum transmit power of the high modulation mode, and the feedback unit feeds back the power adjustment complete event to the AM module after completing the power adjustment; or configured to adjust the transmit power of the radio frequency transmitting module according to the power control mode after the modulation mode has been switched according to the switching event when the switching event is to switch from the high modulation mode to the low modulation mode.

* * * * *